United States Patent [19]
Eggenberger

[11] 3,840,050
[45] Oct. 8, 1974

[54] HIGH-PRESSURE TRIP VALVE
[75] Inventor: Markus A. Eggenberger, Schenectady, N.Y.
[73] Assignee: General Electric Company, Schenectady, N.Y.
[22] Filed: Apr. 26, 1973
[21] Appl. No.: 354,530

[52] U.S. Cl. ............................................. 137/627.5
[51] Int. Cl. ............................................ F16k 11/16
[58] Field of Search ..................... 137/627.5, 630.14

[56] References Cited
UNITED STATES PATENTS
| | | | |
|---|---|---|---|
| 2,213,488 | 9/1940 | Dowrick et al. | 137/627.5 X |
| 3,403,699 | 10/1968 | Fites | 137/627.5 |
| 3,428,090 | 2/1969 | Hose et al. | 137/630.14 |

*Primary Examiner*—Robert G. Nilson
*Attorney, Agent, or Firm*—John F. Ahern; James W. Mitchell

[57] ABSTRACT

A high-pressure trip valve useful in hydraulic protection systems such as emergency trip systems applied to rotating fluid-driven machinery. Hydraulic pressure is applied to opposite faces of a piston head which controls the seating and unseating of a pilot valve. The piston also controls a main valve. Unseating the pilot valve causes the trip mechanism to be reset while unseating the main valve causes the trip mode to be completed. Therebetween a special relief means will cause a trip when the pilot valve is almost seated and the main valve is almost unseated.

9 Claims, 1 Drawing Figure

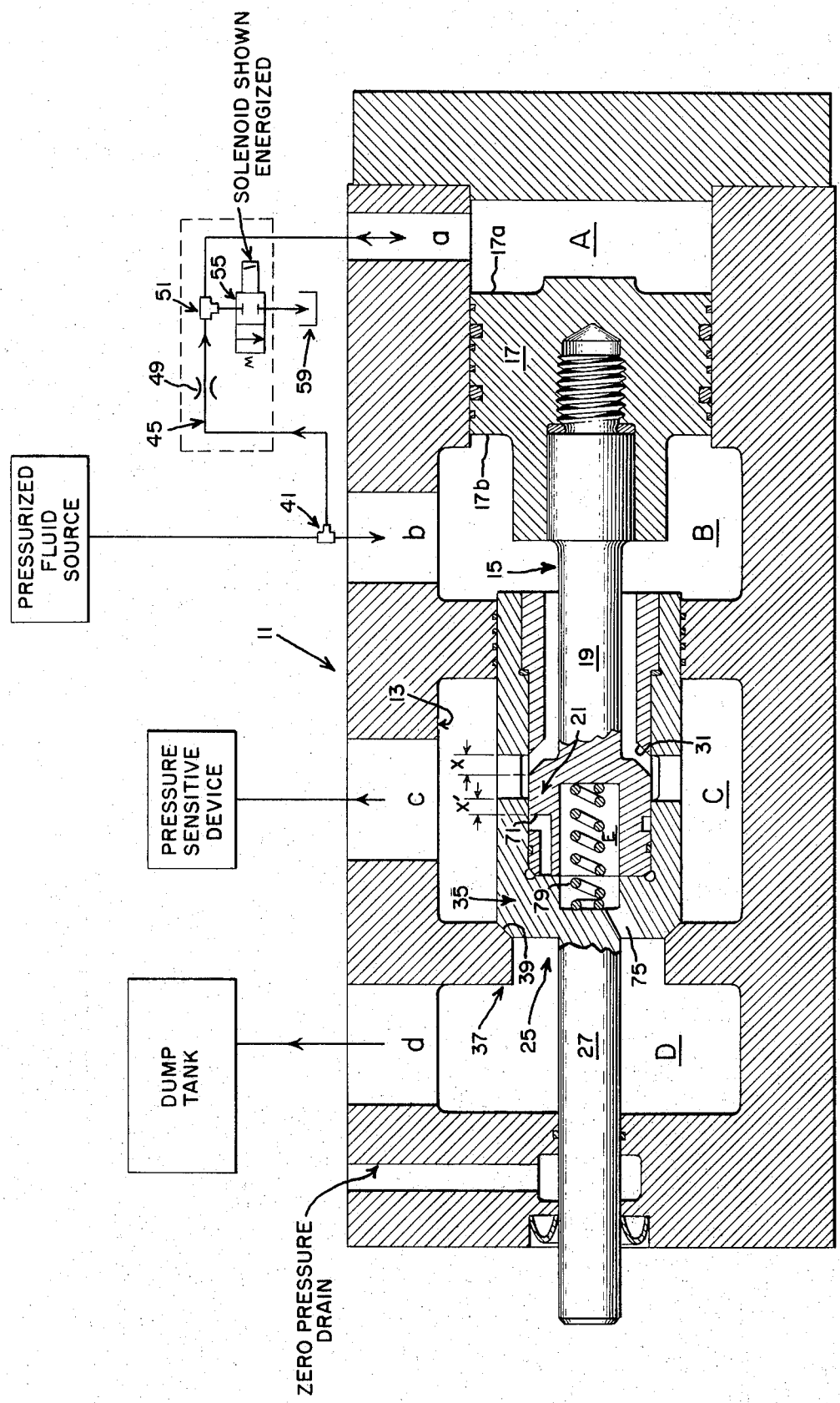

HIGH-PRESSURE TRIP VALVE

BACKGROUND OF THE INVENTION

This invention relates generally to high-pressure valves; and, in particular, this invention relates to valves useful in controlling hydraulic fluid pressure in an emergency trip system for a fluid-driven, rotating machine.

One aspect, of controls design, for a rotating fluid-driven machine; for example, a steam turbine must include an emergency trip system capable of rapidly shutting down the steam flow to a steam turbine upon the relatively rare, but nonetheless critical conditon of overspeed. A greatly simplified construction of a system to shut down steam flow to a steam turbine includes a stop valve in the steam inlet line to the turbine which is held open by a pressurized hydraulic cylinder. The hydraulic trip cylinder is supplied with hydraulic fluid through a trip valve which is responsive to a signal from an overspeed trip device. When an overspeed signal is given, the trip valve causes loss of pressure in the trip cylinder which causes the stop valve to seat rapidly under the influence of a spring mechanism. U.S. Pat. No. 2,926,680 to Eggenberger, assigned to the assignee of the present invention, issued Mar. 1, 1960, is an example of the above discussion. It should be understood that the above discussion is by way of example and that the trip valve is equally applicable to a gas turbine control system and, any other fluid control system where a control valve for fluid under pressure is necessary.

SUMMARY OF THE INVENTION

A high-pressure fluid trip valve comprising an outer casing having an axial bore therein and including a piston and piston follower which define respectively a pilot valve body and a main valve body within the axial bore. Hydraulic pressure is provided from a pressurized fluid source to opposite faces on the piston head whereupon the trip valve is biased in a reset position. In this mode, the pilot valve is open for pressurizing a pressure-sensitive device, i.e.; stop valve, whereas the main valve to a dump tank is closed. A trip is precipitated by dumping fluid on one side of the piston face and thereby causing the piston to be displaced whereupon the pilot valve is closed and the main valve is opened for respectively shutting off the supply of high-pressure fluid and dumping the high-pressure fluid used for pressurizing the pressure-sensitive device. The valve is such, that hydraulic hammer, hereinafter described, is minimized and provision is made for relief of the pressure-sensitive device should the main valve stick in a closed position.

It is therefore one object of the present invention to provide an improved trip valve which utilizes high-pressure hydraulic fluid for supplying a large opening force in the reset mode and a large closing force in the tripping mode thereby minimizing the danger of valve sticking.

It is another object of the present invention to have all sliding fits of the valve under essentially zero pressure drop during operation in order to prevent silting which could make the valve inoperative.

It is another object of the present invention to minimize the occurrence of "hydraulic hammer" as hereinafter described.

It is a further object of the present invention to provide an alternate pressure relief port to the pressure-sensitive device should the main valve fail to open after the pilot valve has closed off the supply pressure port.

These and other objects and advantages will become apparent from the following description of one embodiment of the invention and the novel features will be particularly pointed out hereinafter in the claims.

BRIEF DESCRIPTION OF THE DRAWING

The drawing is an elevation cross section of one preferred embodiment of the present invention having a schematic portion showing the flow direction of hydraulic fluid.

DETAILED DESCRIPTION OF THE INVENTION

Referring to the drawing, one embodiment of the invention comprises a valve casing 11 having an axial bore 13 therein. A piston 15 is slidably positioned within the bore including a piston head 17 having opposing surface areas 17a and 17b. The piston further includes a piston rod 19 connected at one end to the piston head and formed at its free end with a pilot valve body 21.

A piston follower 25 includes a guide stem 27 and an enlarged portion slidably mounted within the bore 13. The enlarged portion of the piston follower provides a pilot valve seat 31 and, moreover, its circumference defines a main valve body 35 which is seated on a circumferential flange 37 in the axial bore which forms a main valve seat 39.

The foregoing being understood, it is clear that the axial bore in the valve is divided into four chambers A, B, C and D having respectively ports "a" (pressure supply and drain), "b" (pressure supply), "c" (pressure), and "d" (drain).

In the reset position chambers A and B are pressurized through ports "a" and "b" respectively from the pressurized fluid source indicated. Pressurized fluid acts on opposing surface areas 17a and 17b causing the piston to move left according to the drawing. This is because piston head surface area 17a is greater than piston head surface area 17b. Pressurized fluid is divided at tee 41 into conduit 45 which includes orifice 49. Orifice 49 meters the flow of hydraulic fluid refill into chamber A after the chamber has been emptied. The pressurized fluid continues through a second tee 51 and into chamber A. Tee 51 is connected with a tank 59 through a solenoid valve 55 which is normally closed except during the tripping sequence. Pilot valve body 21 is unseated in the reset position while main valve body 35 is seated. Therefore, pressurized fluid flows from chamber B to chamber C and out pressure port "c" to a pressure-sensitive device such as a spring-loaded stop valve (not shown).

In the tripping mode, solenoid valve 55 is opened causing the pressurized fluid in chamber A to dump into tank 59. Loss of pressure in A causes the piston to shift to the right until pilot valve body 21 is seated at seat 31 which then causes the piston follower to be moved to the right which unseats the main valve body 35 causing the pressurized fluid stored in chamber C to be dumped into chamber D and from there through port d, to a dump tank. Loss of pressure in chamber C will trip the pressure-sensitive device.

"Hydraulic hammer" is a condition detrimental to piping which is caused by rapidly shutting down a high flow of pressurized fluid. In the present invention, the pilot valve first shuts down fluid flow between chambers B and C before any significant high flow rate can be developed as between chambers B and D due to the main valve being unseated (lost motion). Therefore, in the absence of any development of a high fluid flow rate hydraulic hammer is averted. If a single slide valve without lost motion were positioned between chambers B and D this high flow rate might develop while the fluid in C was being dumped and before the fluid supply to C was being shut down.

Referring to the large portion of the piston follower a pilot valve close distance X and a distance X' are indicated. The distance X exceeds the X' distance which is the distance the pilot valve body must travel, in lost motion, to open small passage 71 to chamber C through the piston follower. Passage 71 is interconnected with passage 75 through chamber E whereby chamber C is in fluid communication with chamber D forming a fluid relief between chambers C and D. Stated simply, before the pilot valve body 21 is seated on valve seat 31, but while it is almost seated, a small fluid flow or relief is permitted between chambers C and D. This occurs during the "lost motion" of the piston and pilot valve. The fluid in chamber C will be dumped at a reduced rate sufficient to trip the pressure-sensitive device. This construction provides a special relief means which will activate a trip even before the main valve body 35 is unseated or even if it becomes frozen in its seated position due to fluid contamination or other reasons.

Spring 79, in chamber E, between the pilot valve body and the enlarged portion of the piston follower insures that during the reset operation the pilot valve will remain seated as long as the main valve is open and until the main valve is seated. Further, a zero pressure drain is provided in the valve casing around the piston follower stem to prevent leaks at the end of the valve casing.

All sliding fits within the axial bore are provided with seals and sealing rings, as shown, whereby there is zero pressure drop across the fits so that "silting," which could cause the valve to stick, is prevented.

The valve operation is as follows. To reset the valve, chambers A and B are pressurized causing the piston to move left, unseating the pilot valve after the main valve is seated causing pressurization of chamber C. In the trip mode, solenoid valve 55 is opened, dumping fluid from chamber A. This causes an unbalanced force to push the piston to the right thereby resulting in a "lost motion" of the piston and a gradual closing of the pilot valve so that hydraulic hammer in the fluid pressure line is averted. Before the pilot valve is seated and during the period of "lost motion" some fluid is dumped from chamber C into chamber D through special relief means 71, E and 75 causing sufficient pressure loss to trip the pressure-sensitive device. This averts any possibility of trip failure due to sticking in the main valve. Thereafter, the pilot valve is seated and the main valve is opened completing the tripping operation.

While there is shown what is considered, at present, to be the preferred embodiment of the invention, it is, of course, understood that various other modifications may be made therein. One such modification might eliminate tees 41 and 51 and pressurize chamber A through the piston head utilizing an orifice therethrough. Also, the fluid dumped from chamber A might be sent directly to the dump tank at $d$. It is intended to cover, in the appended claims, all such modifications which fall within the true spirit and scope of the invention.

What is claimed is:

1. A trip valve for supplying high-pressure fluid to a pressure-sensitive device, the trip valve including a pilot valve and a main valve within an outer casing and further comprising:

a lost motion piston and piston follower slidably mounted in an axial bore within the outer casing;

first, second, third and fourth chambers within the outer casing each having a port opening through the casing; the pilot valve defined by the piston and piston follower forming respectively a pilot valve body and a pilot valve seat between the second and third chambers; and, the main valve defined by the piston follower and a portion of the axial bore forming respectively a main valve body and a main valve seat between the third and fourth chambers, the lost motion limited by the distance between the pilot valve body and the pilot valve seat in a fully open position; and, a spring between the pilot valve body and the piston follower whereby the main valve must be seated before the pilot valve is unseated.

2. The trip valve recited in claim 1 further including pressure relief means through said pilot valve body and said piston follower fluidly interconnecting said third and fourth chambers before said lost motion in said piston and piston follower is complete.

3. The trip valve, recited in claim 2, wherein said piston further includes a piston head slidably positioned between said first and second chambers.

4. The trip valve, recited in claim 3, further including:

a pressurized fluid source;
first and second interconnected conduits respectively connecting said first and second chambers to said pressurized fluid source;
a third conduit interconnecting said first conduit and a dump tank;
a dump valve in said third conduit between said first conduit and said dump tank; and,
flow restricting means in said first conduit between said second and third conduits.

5. The trip valve, recited in claim 4, wherein said dump valve is a solenoid valve.

6. A valve for supplying and dumping a pressurized fluid to and from a pressure-sensitive device comprising:

an outer casing having an axial bore formed therein including first, second, third and fourth chambers, each chamber having a port opening through the outer casing, the third chamber communicating with the pressure-sensitive device;
a piston slidably disposed within the axial bore including, at one end, a piston head between the first and second chambers, the piston head having opposite, unequal surface areas in fluid communication with the first and second chambers respectively; and a pilot valve body, at the other piston end, between the second and third chambers; and a piston follower slidably disposed within the axial bore, the piston follower operatively associated with the piston in a lost motion configuration, the piston follower surrounding the pilot valve body providing a pilot valve seat for the pilot valve body, between the second and third chambers, and a main valve between the third and fourth chambers, the lost motion defined as the distance between the fully open position and the fully closed position of the pilot valve body while the main valve remains seated.

7. The valve, recited in claim 6, further including a fluid passageway through said pilot valve body interconnecting said third and fourth chambers through said piston follower before said pilot valve is seated and said main valve is unseated during said lost motion.

8. The valve, recited in claim 6, further including:
a pressurized fluid source;
first and second interconnected conduits respectively connecting said first and second chambers to said pressurized fluid source;
a third conduit interconnecting said first conduit and a dump tank;
a dump valve in said third conduit between said first conduit and said dump tank; and,
flow restricting means in said first conduit between said second and third conduits.

9. The valve, recited in claim 6, further including fluid-tight seals between the axial bore, the piston and the piston follower.

* * * * *